(12) United States Patent
Weiss et al.

(10) Patent No.: US 8,188,764 B2
(45) Date of Patent: May 29, 2012

(54) EFFICIENT ELECTRICAL HIBERNATE ENTRY AND RECOVERY

(75) Inventors: Yuval Weiss, Nahariya (IL); Daniel Weinfeld, Haifa (IL)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 12/727,073

(22) Filed: Mar. 18, 2010

(65) Prior Publication Data

US 2011/0227641 A1    Sep. 22, 2011

(51) Int. Cl.
  *H03K 17/16* (2006.01)
  *H03K 9/00* (2006.01)
  *H03K 5/19* (2006.01)

(52) U.S. Cl. ............ 326/86; 326/30; 375/316; 375/257; 375/362

(58) Field of Classification Search .................... 326/86, 326/30; 375/316, 257, 362
See application file for complete search history.

(56) References Cited

U.S. PATENT DOCUMENTS

| | | | |
|---|---|---|---|
| 4,964,140 A | 10/1990 | Yonekura | |
| 6,208,161 B1 | 3/2001 | Suda | |
| 7,042,254 B2 | 5/2006 | Hori | |
| 7,200,186 B2* | 4/2007 | Schoenborn | 375/316 |
| 7,203,853 B2 | 4/2007 | Martwick | |
| 7,218,146 B2* | 5/2007 | Shibata et al. | 326/82 |
| 7,352,248 B2 | 4/2008 | Meltzer | |
| 7,439,760 B2* | 10/2008 | Nguyen | 326/30 |
| 7,741,867 B2* | 6/2010 | Carr et al. | 326/30 |
| 7,772,876 B2* | 8/2010 | Nguyen | 326/30 |
| 2003/0174762 A1 | 9/2003 | Schoenborn | |
| 2008/0123792 A1* | 5/2008 | Prete et al. | 375/362 |
| 2009/0070479 A1 | 3/2009 | Anderson | |

FOREIGN PATENT DOCUMENTS

EP      1 662 734 A1    5/2006

OTHER PUBLICATIONS

International Search Report and Written Opinion issued in corresponding PCT Application No. PCT/US2011/027147 dated Jul. 27, 2011 (14 pgs.).

* cited by examiner

*Primary Examiner* — Vibol Tan
(74) *Attorney, Agent, or Firm* — Brinks Hofer Gilson & Lione

(57) ABSTRACT

Systems and methods for operating of one or more devices before, during, and/or after a power-save mode are provided. The system may include a transmitter device that configures the differential signal lines to low-impedance and a predetermined low-voltage during the power-save mode (such as connecting the differential signal lines to ground). The system may also include a receiver device that senses a wake-up signal, determines the type of wake-up signal, and wakes-up according to the type of wake-up signal.

32 Claims, 11 Drawing Sheets

EFFICIENT ELECTRICAL HIBERNATE ENTRY AND RECOVERY

BACKGROUND

Differential signaling is a method of transmitting information electrically using two complementary signals sent on two separate wires. The signal value is the difference in voltage levels on the two separate wires and this value forms the transmitted signal. The receiving device senses the difference between the two signals and ignores the respective voltages of each wire relative to ground. Therefore, differential signaling enables discrimination of signals at lower levels. This transmission technique can be used for analog signaling and digital signaling. Examples of differential signaling include, but are not limited to, LVDS (Low-Voltage Differential Signaling), differential ECL (Emitter-Coupled Logic), PECL (Positive Emitter-Coupled Logic), LVPECL (Low-Voltage Positive Emitter-Coupled Logic), RS-422, RS-485, Ethernet® (twisted pair), USB (Universal Serial Bus), Serial ATA, TMDS (Transition Minimized Differential Signaling), Firewire® (IEEE 1394), and HDMI (High-Definition Multimedia Interface).

Because differential signaling improves system noise immunity over single-ended signaling, many electronics applications, such as portable or mobile devices, can lower the supply voltage in order to save power and reduce unwanted emitted radiation. For example, the voltages transmitted on the differential lines may be much lower than single-ended signaling. The differential signals level transmitted over TXDP and TXDN is around 200 mv. The difference between TXDP and TXDN represent logic "high" or "low".

The differential signals may be sent between two devices, a first of which may be a host device (such as a computer, a personal digital assistant, a mobile telephone, etc.) and a second of which may be a device that interfaces with the host device (such as a memory card, WiFi device, or any other peripheral device). One of the devices may send a power-save command, via the differential signals, to another device to enter a power-save state. The power-save state may comprise hibernation or an idle state. The power-save state is a power management mode that conserves power by reducing power to one or more of the components within the device, such as powering down the one or more components within the device. After receiving the power-save command, the device changes its configuration in order to enter the power-save state and in order to exit from the power-save state (when a subsequent command to "wake-up" or exit the power-save state is sent).

One example configuration of the devices is depicted in FIG. 1. On the host/transmitter side, the output transmitter is configured to be in High-Impedance (HIZ). HIZ is the state of an output terminal which is not currently driven by the circuit. In digital circuits, it means that the signal is neither driven to a logic "high" level nor a logic "low" level. Such a signal can be seen as an open circuit (or "floating" wire) because connecting it to a low-impedance circuit will not affect that circuit; it will instead itself be pulled to the same voltage as the actively driven output.

On the card/receiver side, a series of switches are closed/opened in order to configure the receiver. Specifically, low-value resistors (such as 50Ω), used as high-speed termination resistors for ordinary differential signaling, are disconnected from the differential receiver lines (RXDP, RXDN) and high-value resistors (such as a few KΩ) are connected to the differential receiver lines (RXDP, RXDN). The high-value resistors (shown as R-Large in FIG. 1), when combined with the HIZ state of the output transmitter, simulate a logic "low" at the receiver side. The receiver detects the wakeup signal using detector (DET) when the host device exits HIZ and starts driving active signals on RXDP, RXDN.

The configuration in FIG. 1 has several drawbacks. First, the configuration requires two sets of switchable resistors on the receiver side, with one of the sets having a resistance of a few KΩ. Second, the configuration in FIG. 1 is susceptible to electromagnetic interference (EMI) since the values of the R-Large resistors are so high, necessitating more complex operation to reject EMI pulses.

Another example configuration of the devices is depicted in FIG. 2. After the hibernation command is sent, the host sets its transmitter output to be HIZ. And, the host turns on switchable pull up resistors, so that both differential lines are pulled up to V-PULL UP. There is inherent ground shift voltage between host and card. The ground shift voltage is added to the V-PULL UP, and the total level might be over-voltage and destructive to receiver transistors. The configuration depicted in FIG. 2 thus requires the card receiver to include special circuitry to protect the input transistors.

Again, the configuration depicted in FIG. 2 has several drawbacks. First, the host device requires several additional components, including the pull-up resistors. Second, the card receiver requires the additional special circuitry to account for the ground shift. And, the special circuitry limits the frequency range of the differential signaling, only supporting frequencies up to 1.5 Gbps.

Accordingly, solutions for the power-save state suffer from undue complexity.

SUMMARY

Embodiments of the present invention are defined by the claims, and nothing in this section should be taken as a limitation on those claims.

By way of example, the embodiments described below generally relate to power-save of at least a part of a system. In one embodiment, a device is in communication with a device via differential signal lines. The device comprises a controller and at least two switches. In a power-save mode, the controller sends one or more signals to the switches so that the switches are configured to connect the differential signal lines to low-impedance (such as connecting both of the differential signal lines to ground).

Other embodiments are provided, and each of the embodiments can be used alone or together in combination. Various embodiments will now be described with reference to the attached drawings.

DETAILED DESCRIPTION

Figure 1:
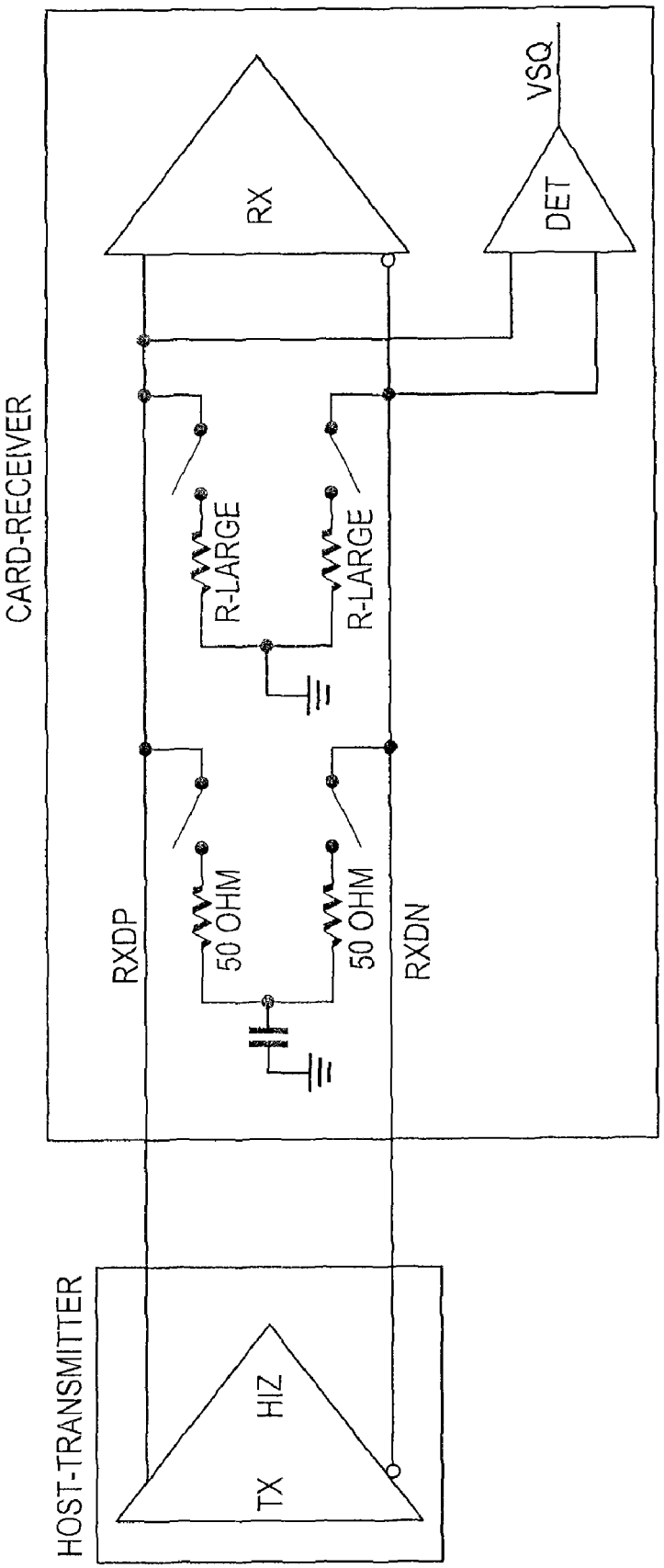
FIG. 1 is a block diagram of a first prior art configuration.

By way of introduction, the following embodiments generally relate to operation of one or more devices before, during, and/or after a power-save mode, such as hibernation or idle. In one embodiment, the system includes two devices, a first device acting as a transmitter and a second device acting as a receiver. In a second embodiment, the second device may further act as a transmitter and the first device may act as a receiver, so that transmissions may be to/from each of the first device and second device.

The first device may communicate with a single second device. Or, the first device may communicate with multiple second devices. Further, the first device can communicate with the one or more second devices via differential signaling. The first device can be a host device, and the second devices can be one or more cards. As discussed in more detail below, the host device can send a power-save command to the one or more cards in order for the one or more cards to enter into a power-save state. The host device may configure at least a part of itself for the power-save state. And, the one or more devices may configure themselves for the power-save state. Further, the one or more cards can send a power-save command to the host device in order for the host device to enter into a power-save state. The one or more cards may configure at least a part of itself for the power-save state. And, the host device may configure itself for the power-save state.

The device that sends the power-save command configures at least one of its transmission differential signal lines to a predetermined low voltage and/or low-impedance. Low-impedance is on the order of, substantially equal to, or less than 50Ω. For example, low-impedance may be on the order of or substantially equal to one, some, or all of the termination resistors used for the differential signal lines. As another example, low-impedance may be on the order of or substantially equal to the characteristic impedance of one or both of the differential signal lines.

In one embodiment, the device that sends the power-save command (such as the hibernation command and/or the wake-up command) configures both of the transmission differential signal lines to the same (or substantially the same) predetermined low-voltage and configures both of the differential signal lines to low impedance. In an alternate embodiment, the device that sends the power-save command (such as the hibernation command and/or the wake-up command) configures only a first of the transmission differential signal lines to the predetermined low-impedance and low-voltage. The second of the transmission differential signal lines may be configured differently than the first of the transmission differential signal lines, such as to high-impedance.

The predetermined low-voltage can be one of several voltages. In one embodiment, the predetermined low-voltage is 0V. For example, 0V may comprise the circuit ground for at least a part of the device that sends a power-save command, such as the circuit ground for a driver circuit of the host device. The driver circuit may be used to transmit data via the differential lines by placing and driving signals on the differential lines.

In an alternate embodiment, the predetermined low-voltage is greater than 0V. Specifically, the predetermined low-voltage can be lower than the lowest differential signaling voltage, higher than the highest differential signaling voltage, or in the range between the lowest differential signaling voltage and the highest differential signaling voltage.

As discussed above, in one embodiment, both of the differential signal lines are set to (or substantially to) the predetermined low-voltage. Specifically, the voltage on each of the two differential signal lines may be configured to be equal to the predetermined low-voltage and low-impedance. For example, in one implementation of LVDS (Low-Voltage Differential Signaling), $V_{OL}=1.0$ V, $V_{OH}=1.4$ V, $V_{CC}=2.5$-$3.3$ V, and $V_{EE}=$GND. In one embodiment, the voltage on each of the two differential signal lines may be configured to be less than $V_{OL}$, such as substantially less than 1.0V or equal to GND.

Or, the voltages on each of the two differential signal lines may be configured to different low-voltages, with the difference in the configured low-voltages being less than a predetermined difference. The predetermined difference may be selected based on the differential wake-up signal that is used to exit the power-save state. In particular, the differential wake-up signal may have at least a minimum difference. The predetermined difference may be less than the minimum difference in the differential wake-up signal so that the receiver does not incorrectly interpret the voltages on the differential signal lines during the power-save state as the differential wake-up signal.

In the example of LVDS, the transmitter can inject a small current (such as 3.5 mA) into one of the differential signal lines depending on the logic sent. The current passes through a resistor, which may be in the range of 50 to 120Ω and matched to the characteristic impedance of the differential lines, at the receiving end, and then returns in the opposite direction along the other wire. From Ohm's law, the voltage difference across the resistor (if it is about 100Ω) is therefore around 350 mV. The receiver senses the polarity of this voltage to determine the logic level. Thus, the predetermined difference between the voltages on the differential signal lines may be less than 350 mV, the minimum difference in the differential wake-up signal.

The host device may configure the predetermined low-impedance and low-voltage on one or both of the differential signal lines in one of several ways. The host device may use passive or active electrical components in order to configure the voltages on the differential lines. As one example, the host device may include one or more switches to configure the voltages on the differential lines. The one or more switches may be part of the host device driver circuit (as discussed below with respect to FIG. 4). Or, the one or more switches may be separate from the host device driver circuit (as discussed below with respect to FIG. 5).

The one or more switches may connect the differential signal lines to ground in order to configure the differential signal lines to the predetermined low-voltage and low impedance. For example, a first switch may connect the first of the differential signal lines directly to ground (e.g., only conduit from the first switch to ground and no intermediate electrical component there between), and a second switch may connect the second of the differential signal lines directly to ground (e.g., only conduit from the second switch to ground and no intermediate electrical devices there between). As another example, the first switch may connect the first of the differential lines to a first intermediate electrical component (such as a first resistor) and the first intermediate electrical component may be connected to ground, and the second of the differential lines to a second intermediate electrical component (such as a second resistor) and the second intermediate electrical component may be connected to ground.

Or, the one or more switches may connect the differential signal lines to a predetermined low-voltage and low-impedance that is different from ground. For example, a voltage regulator may be used to output the predetermined low-voltage and low-impedance. The one or more switches may connect the differential signal lines to the voltage regulator output.

The device that communicates with the host device receives the predetermined low-voltage and low-impedance on one or both of the differential signal lines. One example of the device that communicates with the host device is a card, such as a card that includes a memory device. Examples of memory devices include, but are not limited to, Secure Digital ("SD™") memory cards (an example of a relatively slow flash storage device) and Ultra-High-Speed type II (UHS-II) memory cards (an example of a faster flash storage device). SD is a trademark of SD-3C LLC. UHS-II is a standard developed by the SD Associate for next generation SD™ cards and is one example of a "high speed protocol." Another example of a card may be Universal Flash Storage ("UFS") storage devices. "UFS" is a standard developed by UFS task force working for the Joint Electron Device Engineering Council(s) ("JEDEC") Solid State Technology Association.

In one embodiment, the card may include a wake-up signal detector that detects a wake-up signal on one or both of the differential signal lines. One example of the wake-up signal detector may comprise a differential amplifier that receives as inputs the predetermined low-voltages on the differential signal lines. In another embodiment, the card may include a wake-up signal detector in combination with a wake-up signal evaluator. The wake-up signal evaluator may evaluate at least one aspect of the wake-up signal, such as whether the wake-up signal is a differential signal "high" or a differential signal "low". Based on the determined wake-up signal, the card may wake-up accordingly. For example, a first wake-up signal may indicate an instruction to wake-up after an idle state. In this instance, the card may re-supply power to one or some of its electrical components (such as its receiver and transmitter). As another example, a second wake-up signal may indicate special instruction to be performed during wake-up. In this instance, the card may perform predetermined procedures after receiving the second wake-up signal in addition to re-supply power to one or some of its electrical components.

In this way, the host device and the device in communication with the host device may be configured to: provide an efficient electrical method to signal a move to the power-save state; hold the differential lines efficiently during power-save state; and/or recover from power-save state. In comparison with the configurations disclosed in FIGS. 1 and 2, the present configuration may be done with less EMI, smaller real-estate (e.g., silicon area), and/or less ground shift effects.

Figure 3:
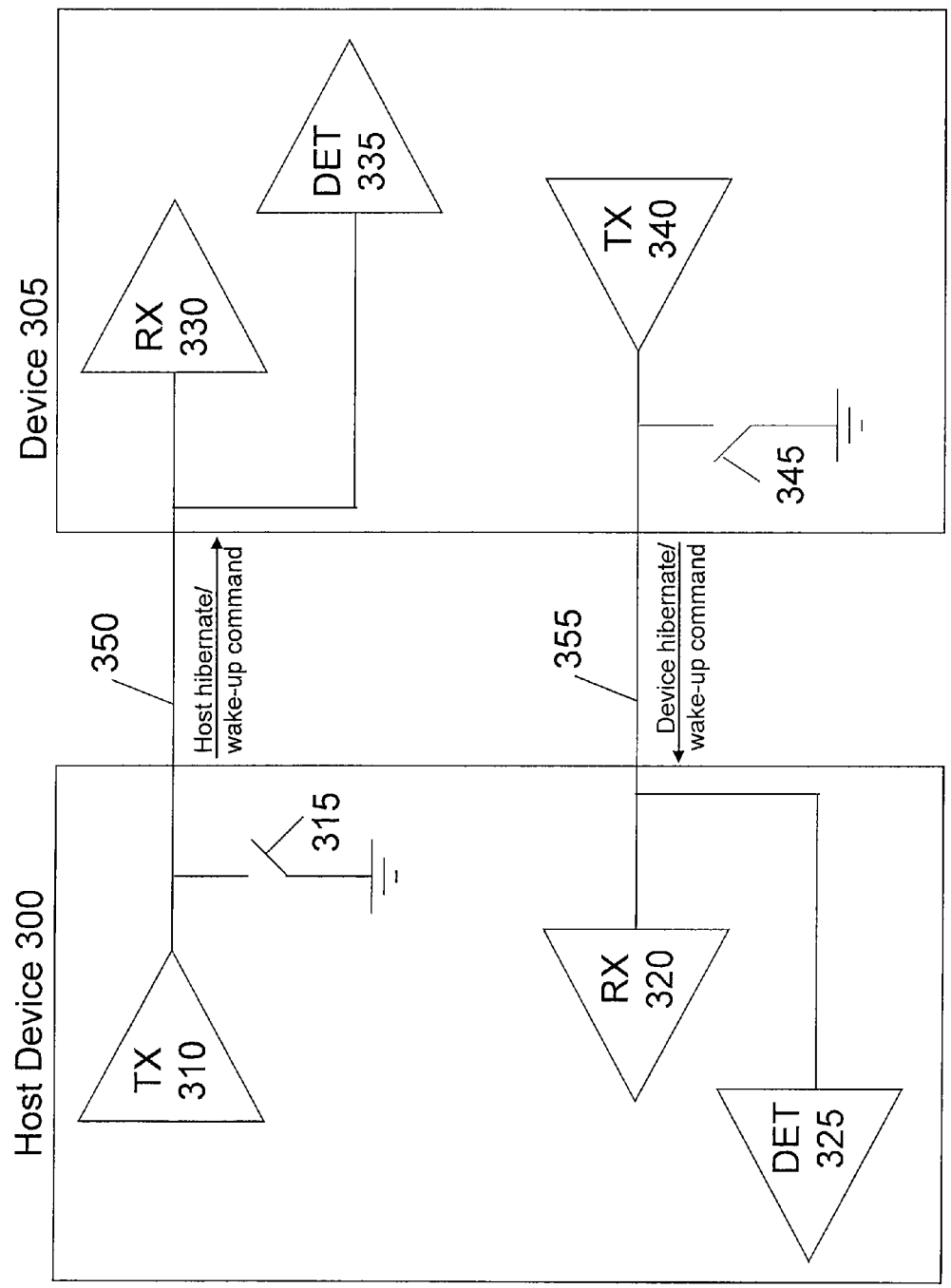
FIG. 3 is a block diagram of a host device and a device transmitting/receiving hibernation and wake-up commands.

FIG. 3 is a block diagram of a host device 300 and a device 305 transmitting/receiving hibernation and wake-up commands. As shown in FIG. 3, the host device 300 includes a transmitter TX 310 and a receiver RX 320. Similarly, the device 305, which may include a card or a peripheral device, includes a transmitter TX 340 and a receiver RX 330. The host device 300 may send a host hibernate command to the device 305. The host hibernate command may be used by device 305 in order to shut-off or remove power from at least a part of the device 305, such as receiver RX 330. The host device 300 may also close switch 315 to connect each of the differential signal lines to ground. In order to wake-up the device 305, the host device 300 sends a host wake-up command. In order to sense the host wake-up command, the device 305 includes detector DET 335, as discussed in more detail below. The host wake-up command may be used by device 305 in order to power on at least a part of the device 305, such as receiver RX 330.

The device 305 may also send a device hibernate command to the host device 300. The device hibernate command may be used by host device 300 in order to shut-off or remove power from at least a part of the host device 300, such as receiver RX 320. The device 305 may also close switch 345 to connect each of the differential signal lines to ground. In order to wake-up the host device 300, the device 305 sends a device wake-up command. In order to sense the device wake-up command, the host device 300 includes detector DET 325. The device wake-up command may be used by the host device 300 in order to power on at least a part of the host device 300, such as receiver RX 320.

Figure 4:
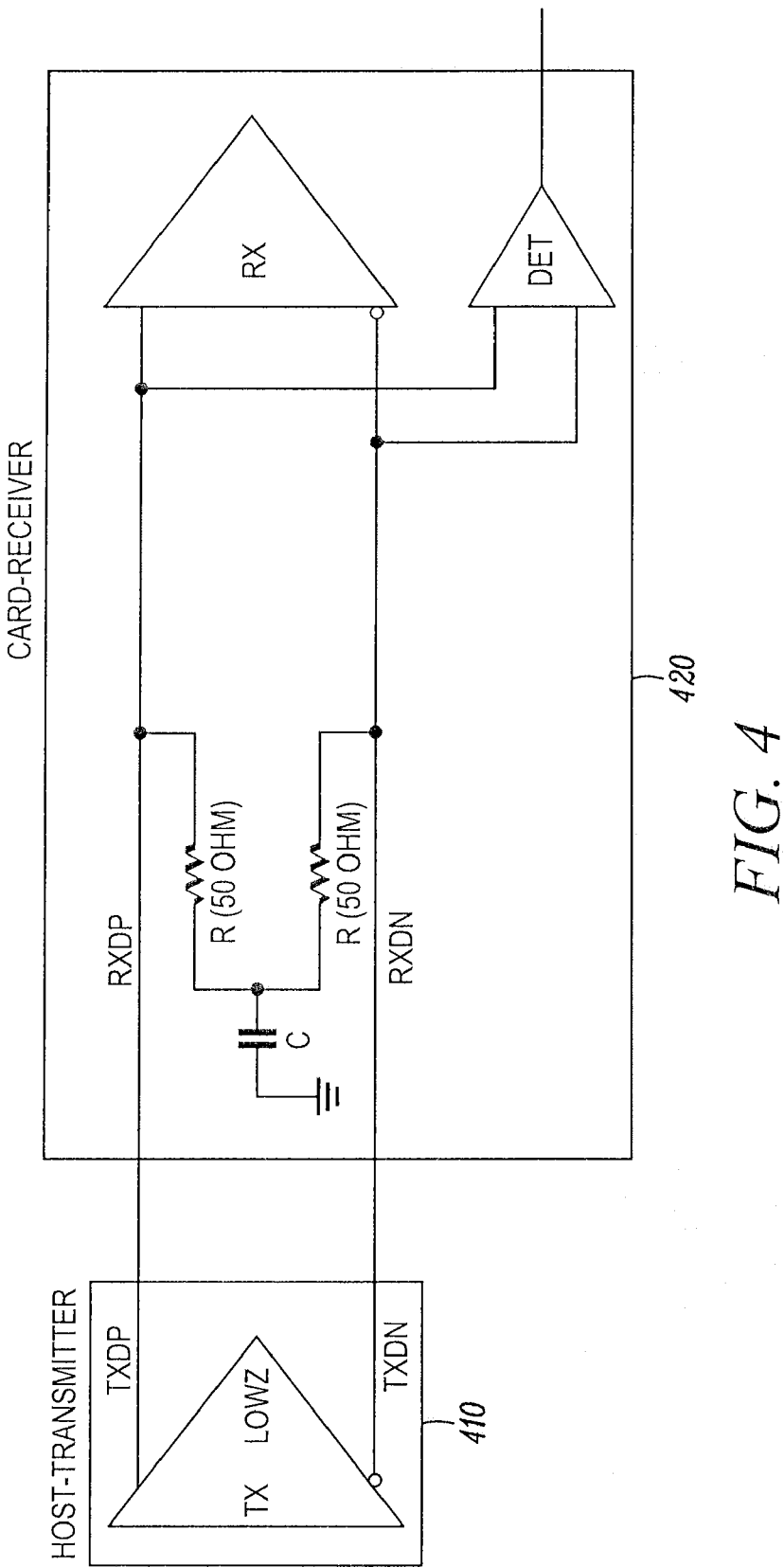
FIG. 4 is a block diagram illustrating the host device/transmitter and card device/receiver.

FIG. 4 depicts a block diagram of host device 410 and card 420. In the configuration depicted in FIG. 4, the host device 410 is acting as a transmitter and the card 420 is acting as a receiver. Further, FIG. 4 illustrates that the host device 410 includes a transmitter TX. During the power-save state (such as after the power-save command has been transmitted from the host device but before the wake-up command is sent), the transmitter TX is configured to have a low-impedance output LOWZ. The low-impedance output LOWZ may be output on one or both of the differential signal lines TXDP and TXDN.

The card 420 includes differential signal lines RXDP and RXDN. The card 420 further includes 2 resistors R rated 50Ω and a capacitor C with a value in the tens of picofarads. The 2 resistors R, which are high speed termination resistors, and the capacitor C are used for ordinary differential signaling. The card 420 also includes a receiver RX that is used to receive the signals on the differential signal lines RXDP and RXDN. The card further includes detector DET configured to detect a wake-up signal and to detect a type of wake-up signal. For example, DET may comprise a differential amplifier to determine a differential voltage on the signal lines, and logic to determine a logic value (whether logic "low" or logic "high") to determine the type of wake-up signal, as discussed in more detail below.

Figure 5:
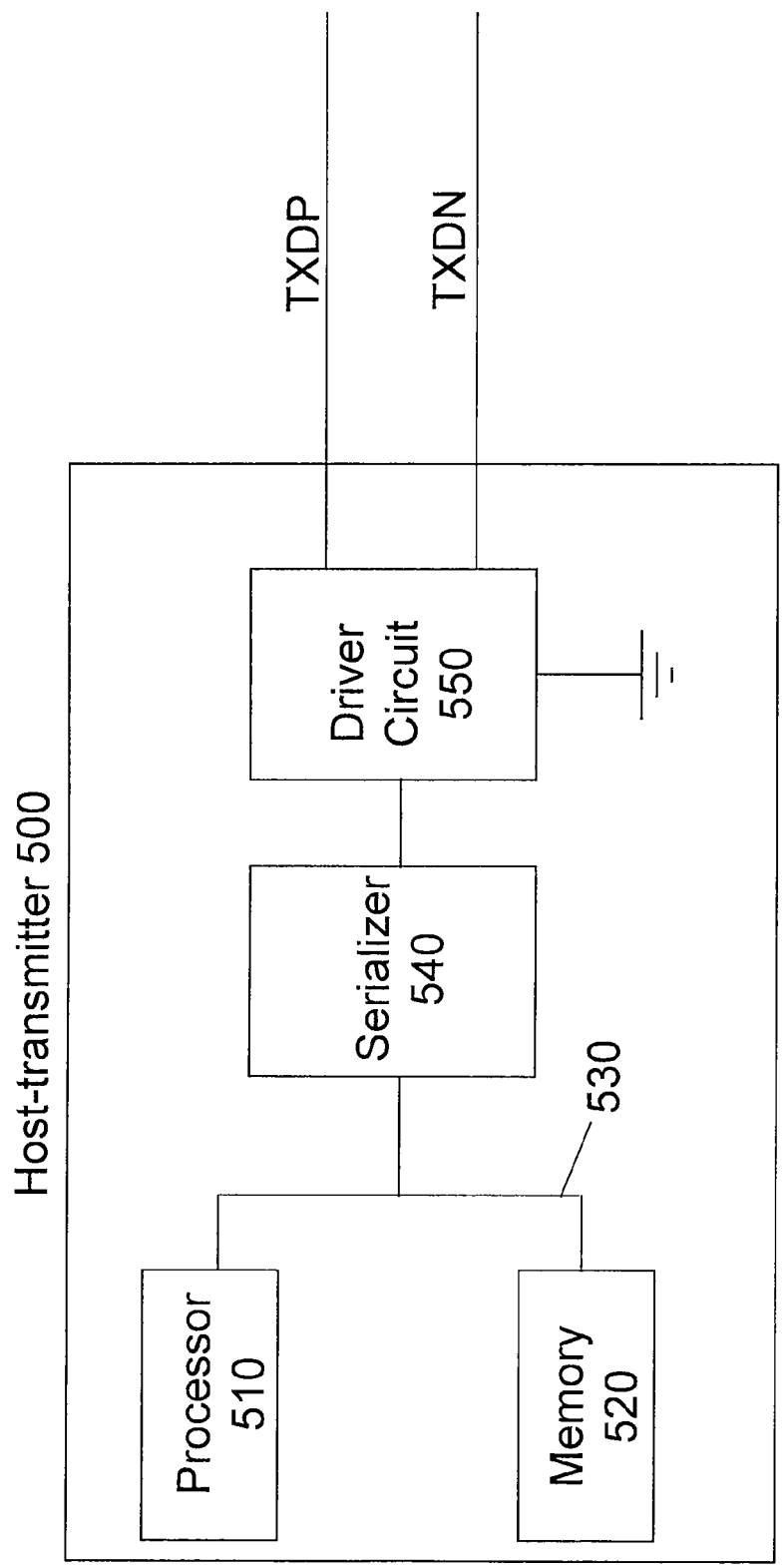
FIG. 5 is one example of an expanded block diagram of the host device/transmitter depicted in FIG. 4.

FIG. 5 is one example of an expanded block diagram of the host device 410 depicted in FIG. 4. The host device 500 may include a processor 510, a memory device 520, and a bus 530 for communicating amongst the various elements of the host device 500. The processor 510 is a controller (such as a microcontroller) or arithmetic logic unit for controlling one or more operations of the host device 500. The host device 500 further includes a driver circuit 550 for driving one, the other, or both of the transmission lines TXDP and TXDN. When transmitting data via the transmission lines TXDP and TXDN, the driver circuit 550 places and drives signals onto the transmission lines TXDP and TXDN so that the difference in voltages on the transmission lines TXDP and TXDN form the pair of differential signals. A pair of differential signals is typically two signals whose current waveforms are one hundred eighty degrees (180°) out of phase with one another.

Further, in the implementation described in FIG. 5, the bus 530 is a parallel bus and the driver circuit 550 receives a serial input. To reconcile the difference, serializer 540 acts as an interface between the parallel bus 530 and the serial input of the driver circuit 550. In operation, the processor 510 may access memory 520 in order to configure a command to the driver circuit 550. The processor 510 sends the command via the bus 530. The bus 530 sends the command to serializer 540, which in turn converts the command into a serial input command for input to driver circuit 550. Driver circuit 550 receives the serial input command and configures itself accordingly. In one aspect, the serial input command received by the driver circuit 550 comprises a command to configure the one or more switches within the driver circuit 550 to connect the differential signal lines TXDP and TXDN to ground. For example, the driver circuit 550, in response to receiving the serial input command may configure one or more switches so that the differential signal lines TXDP and TXDN are both connected to the ground of the driver circuit 550. In another aspect, the serial input command received by the driver circuit 550 comprises a command to disconnect the differential signal lines TXDP and TXDN from ground. In response to the command, the driver circuit 550 may control the one or more switches in the driver circuit 550 to disconnect the differential signal lines TXDP and TXDN from ground.

Figure 6:
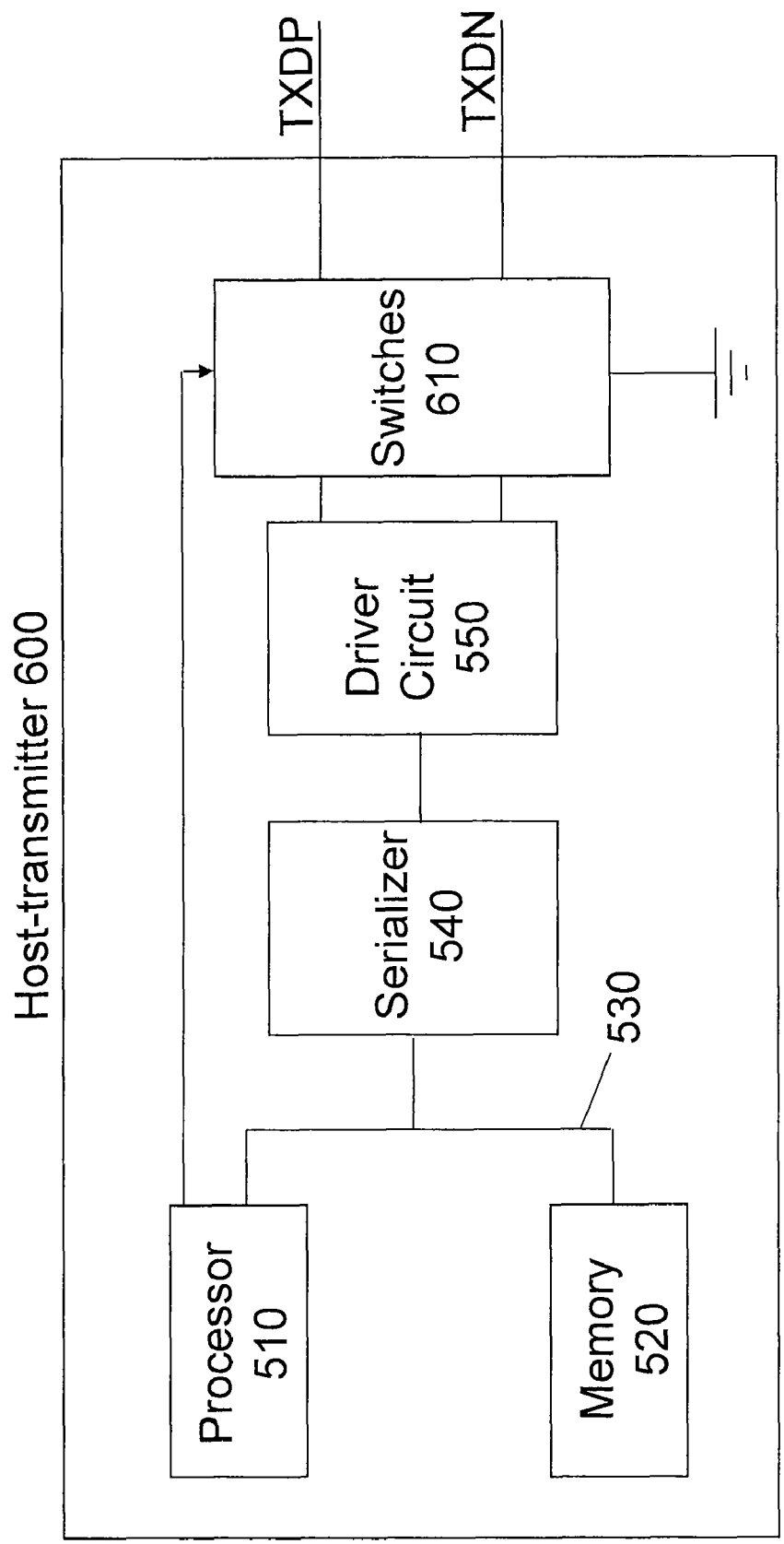
FIG. 6 is second example of an expanded block diagram of the host device/transmitter depicted in FIG. 4.

FIG. 6 is second example of an expanded block diagram of the host device depicted in FIG. 4. Instead of the driver circuit 550 including switches to connect the differential signal lines TXDP and TXDN to ground, switches 610 includes one or more switches to connect the differential signal lines TXDP and TXDN to the ground of at least a part of the host device 600, such as the ground of the driver circuit 550. The switches 610 may comprise one or more transistors. The processor 510 may send a first command to switches 610 to connect the differential signal lines TXDP and TXDN to ground. In particular, switches 610 may comprise a first switch and a second switch. The processor 510 may send the same signal to first switch and the second switch in order for the first switch to close (electrically connecting the first differential line to ground) and for the second switch to close (electrically connecting the second differential line to ground). Or the processor may send a first signal to a first switch in order to close the first switch, and a second signal to the second switch in order to close the second switch. The processor 510 may send a second command to switches 610 to disconnect the differential signal lines TXDP and TXDN from the ground of at least a part of the host device 600.

Figure 7:
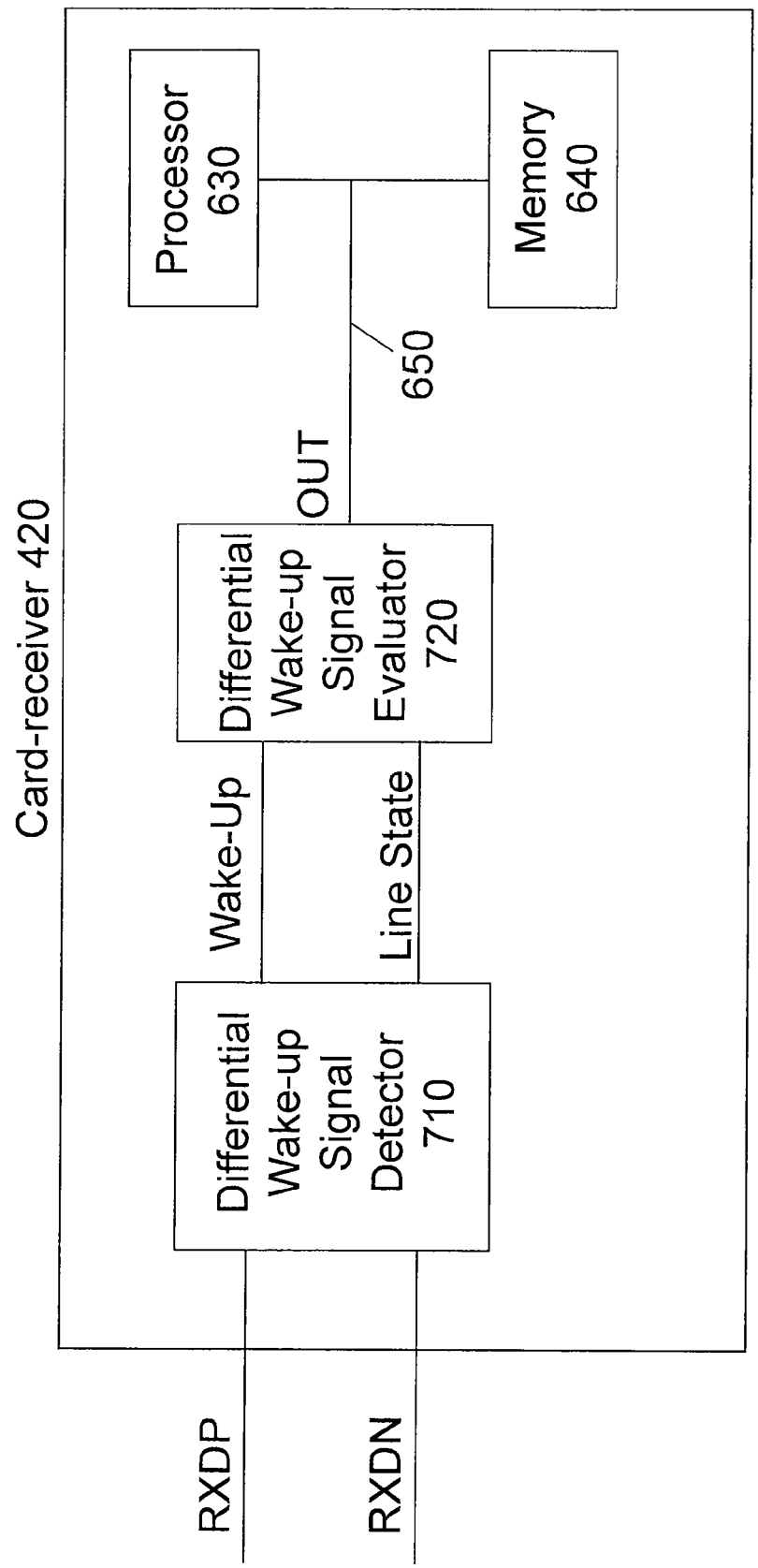
FIG. 7 is one example of an expanded block diagram of the card/receiver depicted in FIG. 4.

FIG. 7 is one example of an expanded block diagram of the card 420 depicted in FIG. 4. The card 420 includes a differential wake-up signal detector 710 that includes circuitry configured to detect whether a differential wake-up signal is present on differential signal lines RXDP and RXDN. In one aspect, the differential wake-up signal detector 710 is configured to compare the voltages on the differential signal lines RXDP and RXDN to determine whether the difference of the voltages exceed a predetermined amount (such as 100 mV). The circuitry for the differential wake-up signal detector 710 may include an amplifier (as discussed with respect to FIGS. 8A-B). Or, the circuitry for the differential wake-up signal detector 710 may comprise a processor or other type of controller configured to compare the voltages on the differential signal lines RXDP and RXDN. The differential wake-up signal detector 710 may generate two outputs: (1) a wake-up signal indicating whether the differential wake-up signal has been received; and (2) line state indicating a logic value of the differential wake-up signal.

The card 420 may further include a differential wake-up signal evaluator 720. The differential wake-up signal evaluator 720 may be responsive to the wake-up signal. In particular, in response to a wake-up signal indicating that the differential wake-up signal has been received, the differential wake-up signal evaluator 720 may evaluate the line state. For example, the line state may indicate a differential "low" or a differential "high". The wake-up signal evaluator 720 may determine a type of differential wake-up signal based on a value that is on the differential signal lines. A differential "low" may indicate a first type of wake-up signal and a differential "high" may indicate a second type of wake-up signal. The output (OUT) of the differential wake-up signal evaluator 720 may be sent via a bus 650 to a processor 630 resident in the card 420. The processor 630 may determine a type of wake-up depending on the type of differential wake-up signal, and access memory 640 in order to determine a set of procedures to wake-up in accordance with the type of wake-up signal. For example, the first type of wake-up may be a boot wake-up, which is a wake-up signal indicative that the card 420 should perform a boot-up procedure. Thus, in response to receiving the boot wake-up, the device may perform one or more procedures to boot up the card 420. The second type of wake-up may be a hibernation wake-up, which is a wake-up signal indicative that the card 420 should perform a hibernation wake-up. Thus, in response to receiving the hibernation wake-up, the device may supply power to one or more sections of the card 420, such as the receiver Rx.

Figures 8, 8A:
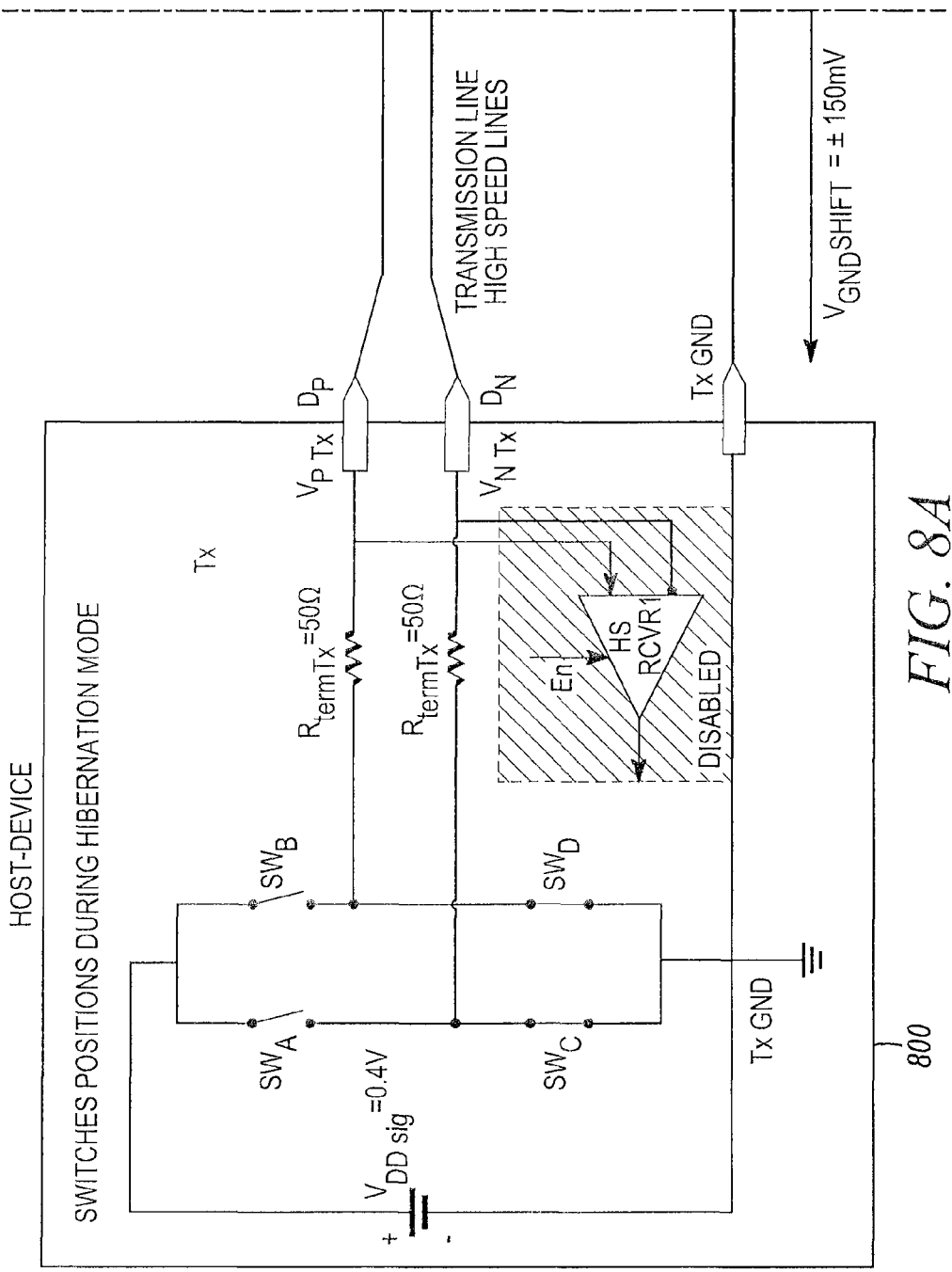
FIGS. 8A-B are still another example of an expanded block diagram of the host device and the card depicted in FIG. 4.
Figure 8B:
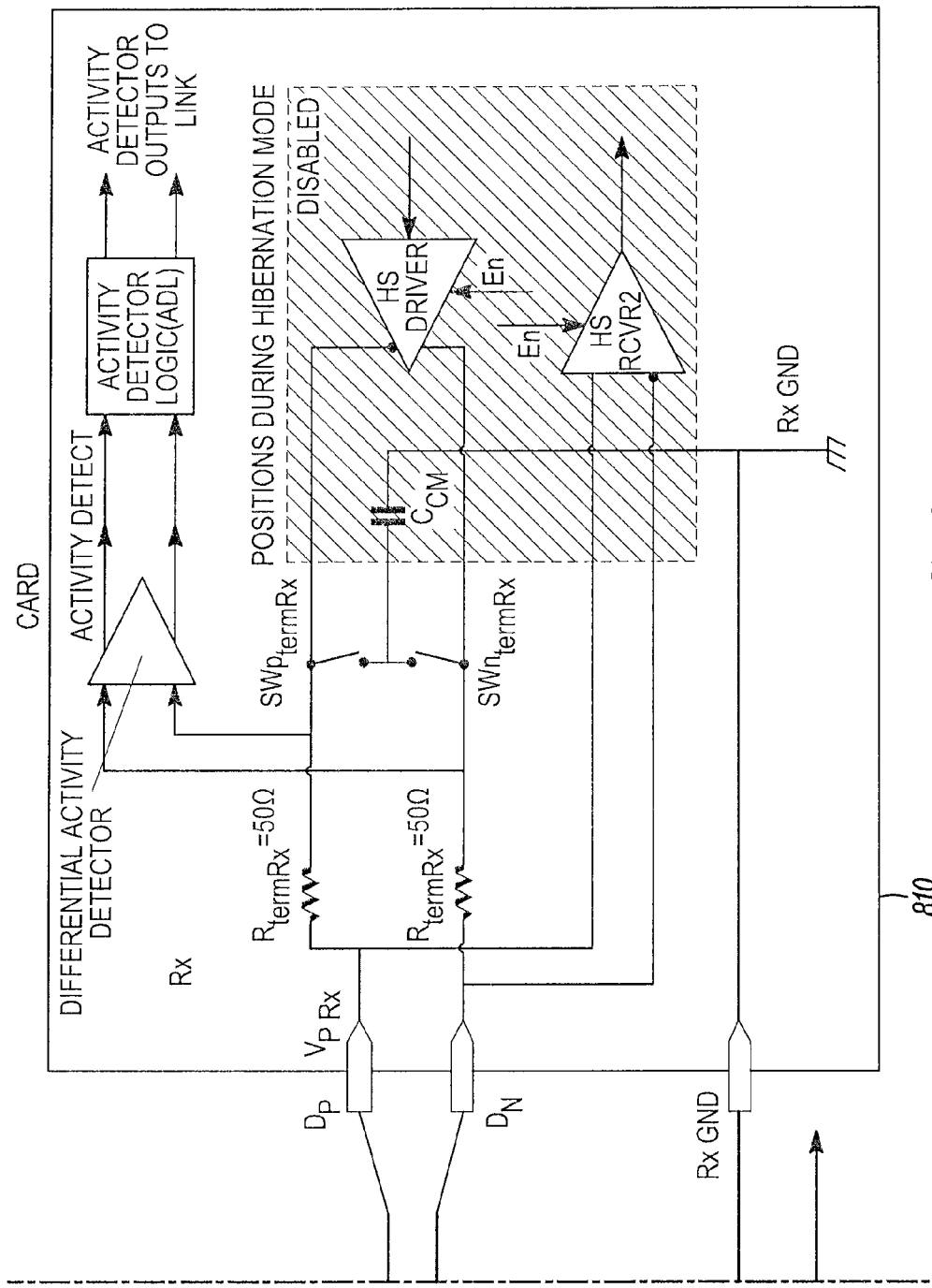

FIGS. 8A-B are still another example of an expanded block diagram of the host device and the card depicted in FIG. 4 in which both the host device 800 and the card 810 are configured during hibernation mode. The host device 800 includes four switches SWA, SWB, SWC and SWD. As discussed above with respect to FIGS. 5 and 6, the four switches may be a part of the driver circuit or may be separate from the driver circuit. In setting the host device 800 to hibernation mode, SWA and SWB are opened, and SWC and SWD are closed. In this way, the differential signal lines are connected to a ground of the host device 800, such as transmission ground Tx GND. As shown in FIGS. 8A-B, the transmission ground Tx GND is connected to the receiver ground Rx GND. Alternatively, SWA and SWB may disconnect the differential lines from one or more amplifiers of the driver circuit. For example, the driver circuit may include a first amplifier and a second amplifier. During differential signaling, the first amplifier may be used to drive a first voltage on the first differential line, and a second amplifier may be used to drive a second voltage on the second differential line. During a power-save mode, the first amplifier and the second amplifier may be turned off. Further, SWA may be opened to electrically disconnect the first amplifier from the first differential signal line, and SWB may be opened to electrically disconnect the second amplifier from the second differential signal line.

Figure 2:
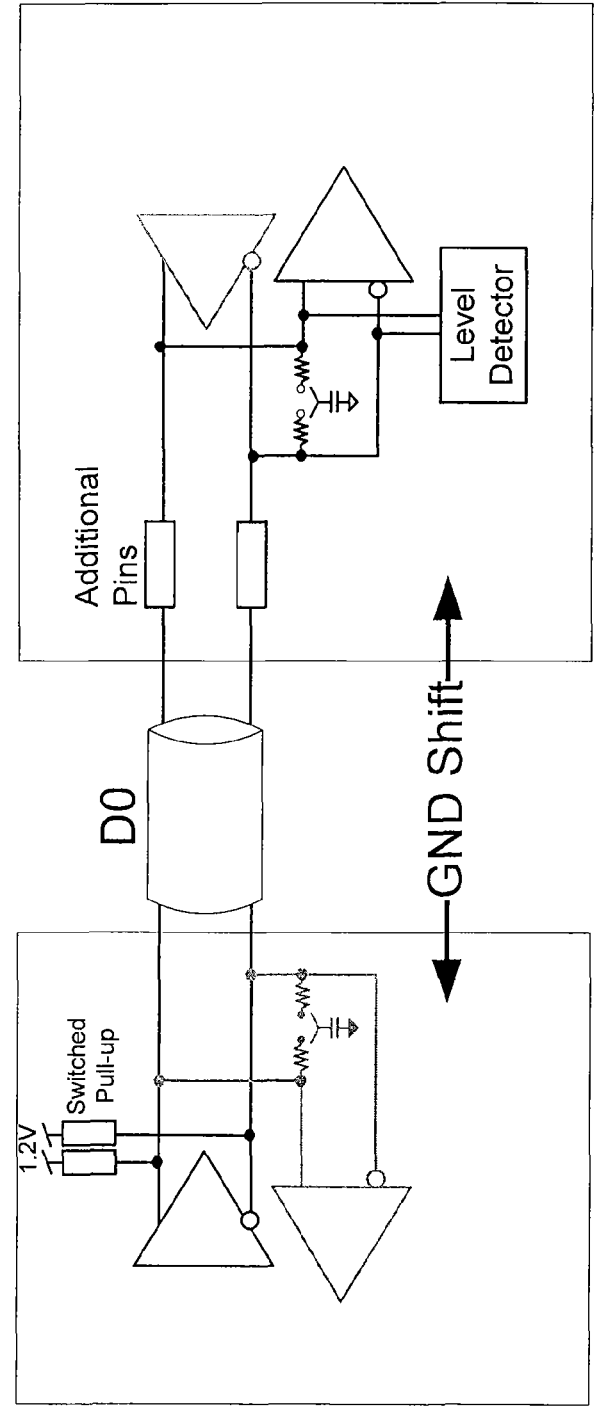
FIG. 2 is a block diagram of a second prior art configuration.

Also, components within the host device 800 may be disabled, such as High-Speed Receiver HS Rcvr1. Thus, because the differential signaling lines are simply connected to ground (rather than being pulled-up to a voltage, such as depicted in FIG. 2), the power dissipated to hold the differential signal lines is lower than a configuration that relies on pull-up transistors. Further, the host device does not need to add any additional resistors or disconnect any resistors on the host device 800 in order to configure the host device 800 for the hibernation mode. Rather, $R_{termTx}$ used as high-speed termination resistors for ordinary differential signaling may remain connected to the differential signaling lines during hibernation mode.

In setting the card 810 to hibernation mode, components within the card 810 may be disabled, such as High-Speed Receiver HS Rcvr2 and High-Speed Driver HS Driver. Further, the card does not need to add any additional resistors or disconnect any resistors on the card 810 in order to configure the card 810 for the hibernation mode. Rather, $R_{termTx}$ used as high-speed termination resistors and switches $SWn_{termRx}$ and $SWp_{termRx}$ for duplex need not be reconfigured. For example, switches $SWn_{termRx}$ and $SWp_{termRx}$ may either be open or closed during the hibernation mode. This is unlike the configuration depicted in FIG. 1, which requires additional switches and large Ω resistors, and the attendant problems with those components. The card 810 may further include a differential activity detector, which is one example of the differential wake-up signal detector 710 depicted in FIG. 7. The differential activity detector may comprise an operational amplifier with hysteresis. The hysteresis of the operational amplifier may be selected such that it is larger than any differences in the voltages on the differential signal lines during hibernation mode, but smaller than the differences in the voltages on the differential signal lines when the differential wake-up signal is sent. The output of the differential wake-up signal detector 710 may be sent to Activity Detector Logic (ADL). The Activity Detector Logic (ADL) is one example of the differential wake-up signal evaluator 720. The Activity Detector Logic (ADL) may output one or more output signals indicative of the type of differential wake-up signal.

Figure 9:
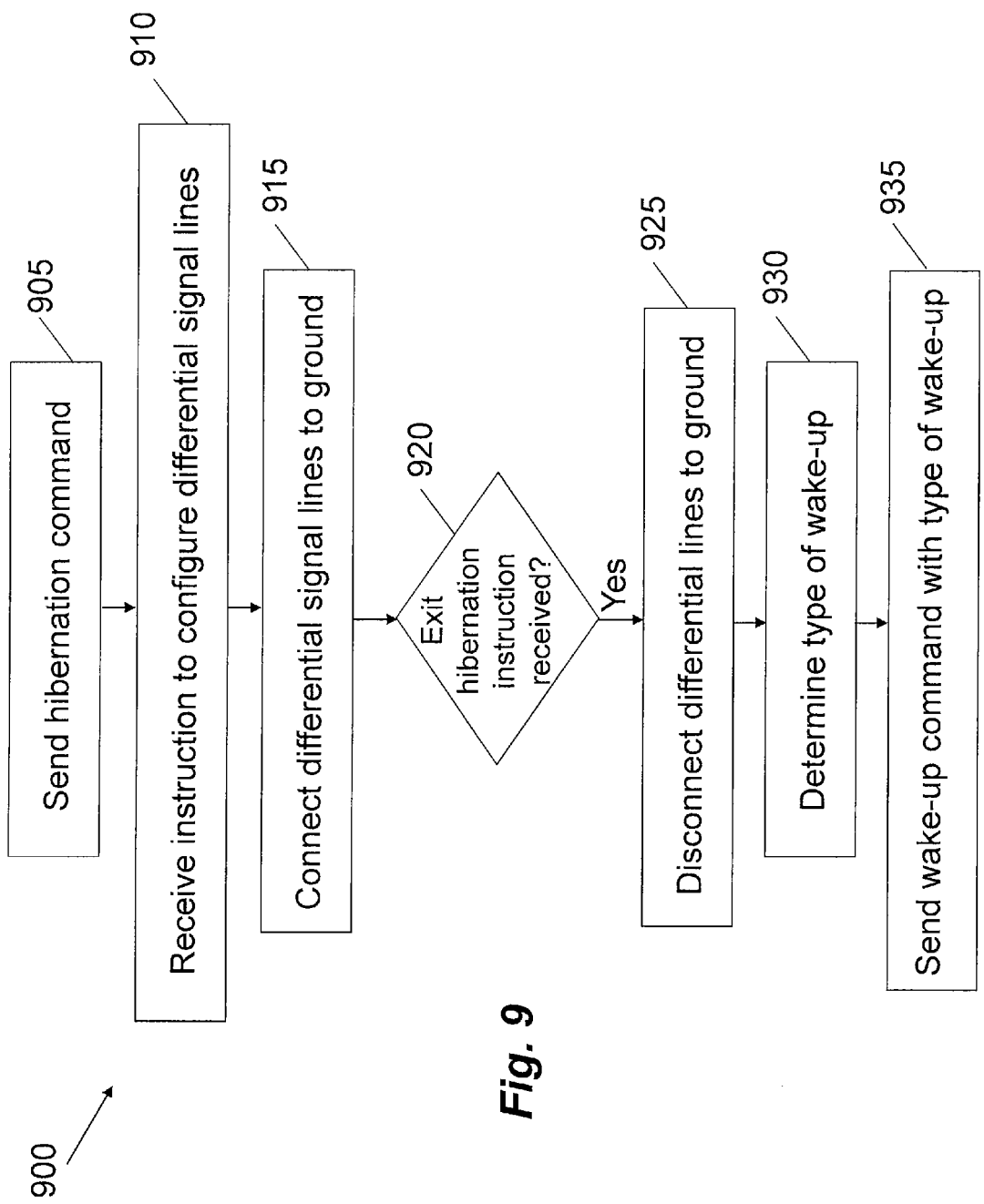
FIG. 9 is an example of a flow chart of a transmitter sending a hibernation command, configuring the differential lines for hibernation, and sending a wake-up command.

FIG. 9 is an example of a flow chart 900 of a power-save operation from the perspective of the transmitter. At 905, the transmitter sends the hibernation command. As discussed above, the host device or a peripheral device, such as a card, may send the hibernation command via one or more driver circuits. In order to send the hibernation command, a processor may instruct the transmitter to transmit the hibernation command via the transmitter, such as processor 510 may instruct driver circuit 550 to send the hibernation command by driving complementary voltages on the differential signal lines to encode the hibernation command.

After the hibernation command is sent, the processor may send an instruction to configure the differential signal lines for hibernation. The instruction to configure the differential signal lines for hibernation may be received by the transmitter at 910. For example, the instruction to configure the differential signal lines for hibernation may comprise an instruction to close one or more switches. The driver circuit, such as driver circuit 550, or switches 610, may receive the instruction to configure the differential signal lines for hibernation. In response to receiving the instruction, at 915, at least a part of the device that sent the hibernation command connects both of the differential signal lines to ground. For example, the driver circuit may close one or more switches in response to receiving the instruction from the processor The transmitter then waits to receive the instruction to exit hibernation, as shown by decision block 920. For example, the processor 510 in the host device 500 may wait to issue the instruction when to exit hibernation. When it is time to exit hibernation, the processor 510 sends the instruction (such as an instruction to configure one or more switches). In response to receiving the instruction to exit hibernation, the transmitter disconnects both of the differential signal lines from ground at 925. The transmitter may further determine a type of wake-up (such as boot wake-up or hibernation wake-up) at 930. And, the transmitter sends the wake-up command with the type of wake-up included at 935.

Figure 10:
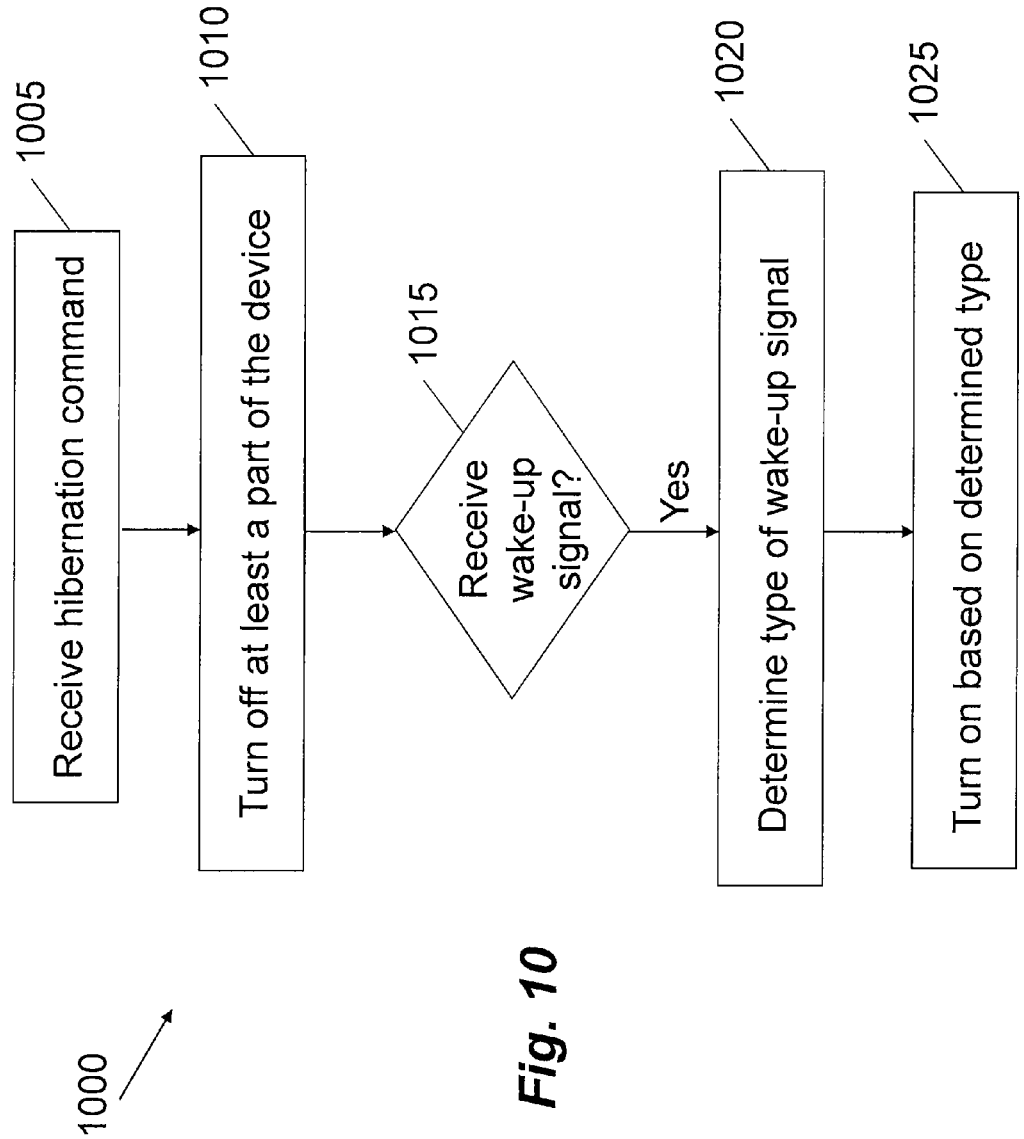
FIG. 10 is an example of a flow chart of a receiver of a hibernation command, sensing the wake-up command, and configuring the receiver to wake-up.

FIG. 10 is an example of a flow chart 1000 of a power-save operation from the perspective of the receiver. At 1005, the receiver receives the hibernation command. As discussed above, the host device or a peripheral device, such as a card, may receive the hibernation command. In response to receiving the hibernation command, at 1010, the device turns off at least a part of itself. For example, the device may turn off the receiver in response to receiving the hibernation command. The device then waits to receive the wake-up signal, as shown in the decision block of 1015. In response to receiving the wake-up signal, the device determines the type of wake-up signal received at 1020. As discussed above, one of a plurality of wake-up signals may be issued. The type of wake-up signal may determine the one or more operations performed to exit the power-save state. At 1025, the device exits from the power-save state by turning itself on based on the determined type of wake-up signal.

It is intended that the foregoing detailed description be understood as an illustration of selected forms that the invention can take and not as a definition of the invention. It is only the following claims, including all equivalents, that are intended to define the scope of this invention.

What is claimed is:

1. A device for communication with a second device via differential signal lines, the device comprising:
   a controller;
   one or more first switches in communication with the controller and configured to connect, during at least a part of a power-save mode in response to receiving at least one signal indicative of the power-save mode from the controller, low-impedance to a first differential signal line and to maintain voltage on the first differential signal line to the second device to be less than complementary voltages used during signaling with the second device; and
   one or more second switches in communication with the controller and configured to connect, during the at least a part of a power-save mode in response to receiving the at least one signal from the controller, low impedance to a second differential signal line and to maintain voltage on the second differential signal line to the second device to be less than complementary voltages used during signaling with the second device.

2. The device of claim 1, wherein the voltages on the voltage maintained on the first differential signal line and the second differential signal line are substantially the same.

3. The device of claim 2, further comprising:
   a driver circuit configured to drive the complementary voltages on the differential signal lines, the driver circuit including a first amplifier and a second amplifier;
   a first signaling switch configured to electrically connect the first amplifier with the first differential signal line; and
   a second signaling switch configured to electrically connect the second amplifier with the second differential signal line,
   wherein the controller is configured to:
   close the one or more first switches and the one or more second switches, and open the first signaling switch and second signaling switch during the at least a part of the power-save mode; and
   open the one or more first switches and the one or more second switches, and close the first signaling switch and second signaling switch during a signaling mode.

4. The device of claim 3, wherein the one or more first switches are configured to electrically connect the first differential signal line to ground; and
   wherein the one or more second switches are configured to electrically connect the second differential signal line to ground.

5. The device of claim 1, wherein the one or more first switches are configured to connect the first differential signal line to ground in response to receiving the at least one signal; and
   wherein the one or more second switches are configured to connect the second differential signal line to the ground in response to receiving the at least one signal.

6. A device configured to communicate via differential signal lines, the device comprising:

driver circuitry configured to drive complementary voltages on the differential signal lines to encode information on the differential signal lines;

circuitry in electrical communication with at least one of the differential signal lines, the circuitry configured to:
receive an instruction to configure the at least one of the differential signal lines to a power-save mode; and
in response to receiving the instruction, configuring the device so that the at least one of the differential signal lines is not driven from any driver circuitry during at least a part of the power-save mode.

7. The device of claim 6, wherein the circuitry is configured to connect the at least one of the differential signal lines ground in response to receiving the instruction.

8. The device of claim 7,
wherein the circuitry is configured to connect both of the differential signal lines electrically to ground in response to receiving the instruction.

9. The device of claim 6, wherein the voltages on both of the differential signal lines are substantially the same.

10. The device of claim 6, wherein the driver circuitry is configured to send a differential wake-up signal to a peripheral device via the differential signal lines, the differential wake-up signal comprising a first wake-up voltage on the first differential signal line and a second wake-up voltage on the second differential signal line; and
wherein a difference between the first wake-up voltage and the second wake-up voltage is greater than a difference between the first predetermined low-voltage and the second predetermined low-voltage.

11. A method of configuring differential signal lines during at least a part of a power-save mode, the method comprising:
driving complementary voltages on the differential signal lines to encode a power-save command during a signaling mode;
connecting a first differential signal line to low-impedance and a first predetermined voltage during the at least a part of a power-save mode; and
connecting a second differential signal line to low-impedance and a second predetermined voltage during the at least a part of the power-save mode,
wherein the first predetermined voltage and the second predetermined voltage are less than the complementary voltages during the signaling mode.

12. The method of claim 11, wherein the first predetermined voltage is substantially equal to the second predetermined voltage.

13. The method of claim 11, wherein connecting the first differential signal line to low-impedance comprises electrically connecting the first differential signal line to ground; and
connecting the second differential signal line to low-impedance comprises electrically connecting the second differential signal line to the ground.

14. The method of claim 11, further comprising sending a differential wake-up signal via the differential signal lines, the differential wake-up signal encoding a type of wake-up from a plurality of types of wake-up.

15. A device configured to communicate via differential signal lines with a second device, the device comprising:
a controller; and
circuitry in communication with the controller, the circuitry configured to:
receive, during at least a part of a power-save mode, predetermined low-impedance voltages on the differential signal lines to the second device, the predetermined low-impedance voltages being less than complementary voltages during a signaling mode with the second device;
determine whether a differential wake-up signal has been received; and
output a wake up signal to the controller in response to determining that the differential wake-up has been received.

16. A device configured to communicate via differential signal lines with a second device, the device comprising:
a controller; and
circuitry in communication with the controller, the circuitry configured to:
in a power-save mode, determine whether a differential wake-up signal has been received; and
output a wake up signal to the controller in response to determining that the differential wake-up has been received,
wherein the circuitry comprises an amplifier;
wherein the differential signal lines includes a first differential line and a second differential line;
wherein the differential wake-up signal comprises a first wake-up voltage on the first differential signal line and a second wake-up voltage on the second differential signal line; and
wherein the amplifier is configured to output the wake up signal only when a difference between the first wake-up voltage and the second wake-up voltage is greater than a predetermined amount.

17. A device configured to communicate via differential signal lines with a second device, the device comprising:
a controller; and
circuitry in communication with the controller, the circuitry configured to:
in a power-save mode, determine whether a differential wake-up signal has been received; and
output a wake up signal to the controller in response to determining that the differential wake-up has been received,
wake-up signal evaluator circuitry configured to determine a type of the differential wake-up signal, wherein the type of the differential wake-up signal determining actions of the device to wake up in response to receiving the differential wake-up signal.

18. The device of claim 17, wherein a first type of differential wake-up signal comprises a boot wake-up, the device booting up in response to receiving the boot wake-up; and
wherein a second type of differential wake-up signal comprises a hibernation wake-up, the device powering up in response to receiving the hibernation wake-up.

19. The device of claim 15, wherein resistance for the differential signal lines when determining whether the differential wake-up signal has been received is substantially the same as resistance for the differential signal lines when determining a differential signal on the differential line.

20. A method of operating a device during a power-save mode, the method comprising:
receiving, during a signaling mode, complementary voltages on the differential signal lines to encode a power-save command on the differential signal lines;
receiving, during at least a part of a power-save mode, low-impedance and predetermined voltages on the differential signal lines, the predetermined voltages being less than the complementary voltages during the signaling mode;
determining whether a differential wake-up signal has been received; and outputting a wake up signal in response to determining that the differential wake-up has been received.

21. The method of claim 20, wherein the predetermined voltages are substantially the same.

22. The method of claim 20, wherein the predetermined voltages are substantially ground.

23. The method of claim 20, further comprising:
determine a type of the differential wake-up signal, the type being one of a plurality of types; and
waking up in response to the determined type of differential wake-up signal.

24. The method of claim 23, wherein a first type of differential wake-up signal comprises a boot wake-up; and
wherein waking up comprises booting up in response to receiving the boot wake-up.

25. A device for communication with a second device via differential signal lines, the device comprising:
a controller;
a driver circuit configured to drive complementary voltages on the differential signal lines, the driver circuit including a first amplifier and a second amplifier;
a first signaling switch configured to electrically connect the first amplifier with a first differential signal line; and
a second signaling switch configured to electrically connect the second amplifier with a second differential signal line,
wherein the controller is configured to:
operate the first signaling switch to disconnect the first amplifier from the first differential signal line during at least a part of the power-save mode; and
operate the second signaling switch to disconnect the second amplifier from the second differential signal line during at least a part of the power-save mode.

26. The device of claim 25, further comprising:
one or more first switches configured to maintain voltage on the first differential signal line to be no greater than complementary voltages during signaling and disallow signaling on the first differential signal line during at least a part of a power-save mode in response to receiving at least one signal from the controller; and
one or more second switches configured to maintain voltage on the second differential signal line to be no greater than complementary voltages during signaling and disallow signaling on the second differential signal line during the at least a part of the power-save mode in response to receiving the at least one signal from the controller.

27. The device of claim 26, wherein the controller is further configured to:
operate the first switch to disconnect the first differential signal line from ground during at least a part of a signaling mode;
operate the second switch to disconnect the second differential signal line from ground during at least a part of the signaling mode;
operate the first signaling switch to connect the first amplifier from the first differential signal line during at least a part of the signaling mode; and
operate the second signaling switch to connect the second amplifier from the second differential signal line during at least a part of the signaling mode.

28. A device for communication with a second device via differential signal lines, the device comprising:
a controller configured to send an instruction to configure at least one of the differential signal lines to a power-save mode; and
one or more switches configured to receive the instruction to configure the at least one of the differential signal lines to the power-save mode so that the at least one of the differential signal lines is substantially at ground during at least a part of the power-save mode.

29. The device of claim 28, wherein the one more switches comprises:
at least a first switch configured to electrically connect a first differential signal line substantially to ground during the at least a part of the power-save mode in response to receiving the instruction from the controller; and
at least a second switch configured to electrically connect a second differential signal line substantially to ground during the at least a part of the power-save mode in response to receiving the instruction from the controller.

30. The device of claim 29, wherein the first switch and the second switch constrain the voltages on the differential signal lines substantially to ground.

31. The device of claim 30, further comprising:
a driver circuit configured to drive the complementary voltages on the differential signal lines, the driver circuit including a first amplifier and a second amplifier;
a first signaling switch configured to electrically connect the first amplifier with the first differential signal line; and
a second signaling switch configured to electrically connect the second amplifier with the second differential signal line,
wherein the controller is configured to:
operate the at least a first switch to connect the first differential signal line to ground during at least a part of the power-save mode;
operate the at least a second switch to connect the second differential signal line to ground during at least a part of the power-save mode;
operate the first signaling switch to disconnect the first amplifier from the first differential signal line during at least a part of the power-save mode; and
operate the second signaling switch to disconnect the second amplifier from the second differential signal line during at least a part of the power-save mode.

32. The device of claim 31, wherein the controller is further configured to:
operate the at least a first switch to disconnect the first differential signal line from ground during at least a part of a signaling mode;
operate the at least a second switch to disconnect the second differential signal line from ground during at least a part of the signaling mode;
operate the first signaling switch to connect the first amplifier to the first differential signal line during at least a part of the signaling mode; and
operate the second signaling switch to connect the second amplifier to the second differential signal line during at least a part of the signaling mode.

* * * * *